(12) United States Patent
Potnis

(10) Patent No.: US 10,861,189 B2
(45) Date of Patent: Dec. 8, 2020

(54) VEHICLE CAMERA MODEL FOR SIMULATION USING DEEP NEURAL NETWORKS

(71) Applicant: Magna Electronics Inc., Auburn Hills, MI (US)

(72) Inventor: Anuj S. Potnis, Pune (IN)

(73) Assignee: MAGNA ELECTRONICS INC., Auburn Hills, MI (US)

(*) Notice: Subject to any disclaimer, the term of this patent is extended or adjusted under 35 U.S.C. 154(b) by 176 days.

(21) Appl. No.: 16/227,666

(22) Filed: Dec. 20, 2018

(65) Prior Publication Data

US 2019/0197731 A1 Jun. 27, 2019

Related U.S. Application Data

(60) Provisional application No. 62/608,605, filed on Dec. 21, 2017.

(51) Int. Cl.
*G06K 9/00* (2006.01)
*G06E 1/00* (2006.01)
*G06T 7/80* (2017.01)
*H04N 7/18* (2006.01)
*G06N 3/08* (2006.01)
*H04N 17/00* (2006.01)

(52) U.S. Cl.
CPC .............. *G06T 7/80* (2017.01); *G06N 3/088* (2013.01); *H04N 7/183* (2013.01); *H04N 17/002* (2013.01); *G06T 2207/20081* (2013.01); *G06T 2207/20084* (2013.01)

(58) Field of Classification Search
USPC ....... 382/100, 103–108, 156, 162, 168, 173, 382/181, 199, 219, 224, 232, 254, 274, 382/276, 285–291, 305, 312; 706/16, 6; 348/38
See application file for complete search history.

(56) References Cited

U.S. PATENT DOCUMENTS

| | | |
|---|---|---|
| 5,448,484 A | 9/1995 | Bullock et al. |
| 5,541,590 A | 7/1996 | Nishio |
| 5,550,677 A | 8/1996 | Schofield et al. |
| 5,670,935 A | 9/1997 | Schofield et al. |
| 5,949,331 A | 9/1999 | Schofield et al. |
| 6,396,408 B2 | 5/2002 | Drummond et al. |
| 6,485,081 B1 | 11/2002 | Bingle et al. |
| 8,258,932 B2 | 9/2012 | Wahlstrom |
| 8,373,581 B2 | 2/2013 | Hassan et al. |
| 9,117,123 B2 | 8/2015 | Nix |
| 9,180,908 B2 | 11/2015 | Van Dan Elzen et al. |

(Continued)

*Primary Examiner* — Seyed H Azarian
(74) *Attorney, Agent, or Firm* — Honigman LLP

(57) ABSTRACT

A camera simulation system or method or process for simulating performance of a camera for a vehicle includes providing a camera having a lens and imager and providing a learning algorithm. Image data is captured from a raw image input of the camera and the captured image data and raw image input are output from the camera. The output image data and the raw image input are provided to the learning algorithm. The learning algorithm is trained to simulate performance of the lens and/or the imager using the output captured image data and the raw image data input. The performance of the lens and/or the imager is simulated responsive to the learning algorithm receiving raw images.

18 Claims, 3 Drawing Sheets

(56) References Cited

U.S. PATENT DOCUMENTS

| | | |
|---|---|---|
| 9,445,057 B2 | 9/2016 | May et al. |
| 10,328,932 B2 | 6/2019 | Gieseke et al. |
| 2015/0296135 A1 | 10/2015 | Wacquant et al. |
| 2016/0137126 A1* | 5/2016 | Fursich .............. H04N 5/23238 348/38 |
| 2018/0349678 A1* | 12/2018 | Koskan .............. G06K 9/00604 |
| 2019/0149425 A1* | 5/2019 | Larish ................. G06N 3/0454 706/16 |
| 2019/0155284 A1* | 5/2019 | Zavesky ........... B60W 30/0953 |
| 2019/0271550 A1* | 9/2019 | Breed .................... G08G 1/147 |

* cited by examiner

VEHICLE CAMERA MODEL FOR SIMULATION USING DEEP NEURAL NETWORKS

CROSS REFERENCE TO RELATED APPLICATION

The present application claims the filing benefits of U.S. provisional application Ser. No. 62/608,605, filed Dec. 21, 2017, which is hereby incorporated herein by reference in its entirety.

FIELD OF THE INVENTION

The present invention relates generally to systems for modeling a camera sensor.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a test or simulation system for a camera for a vehicle, such as for a driver assistance system or vision system or imaging system for a vehicle that utilizes one or more cameras to capture image data representative of images exterior of the vehicle. The simulation system of the present invention provides a software-in-loop system for modeling a camera sensor in a software simulation environment such that it mimics the physical sensor behavior. The simulation system of the present invention uses a physical camera output and generates a simulation output and compares the physical camera output to the simulation output to train the learning algorithm, which adjusts its output until the output of the learning algorithm sufficiently matches the physical camera output (e.g. where the differences between the outputs are below a threshold level). When the outputs sufficiently match, the simulation output can be used instead of the physical camera output.

These and other objects, advantages, purposes and features of the present invention will become apparent upon review of the following specification in conjunction with the drawings.

LEGEND

Figure 1:
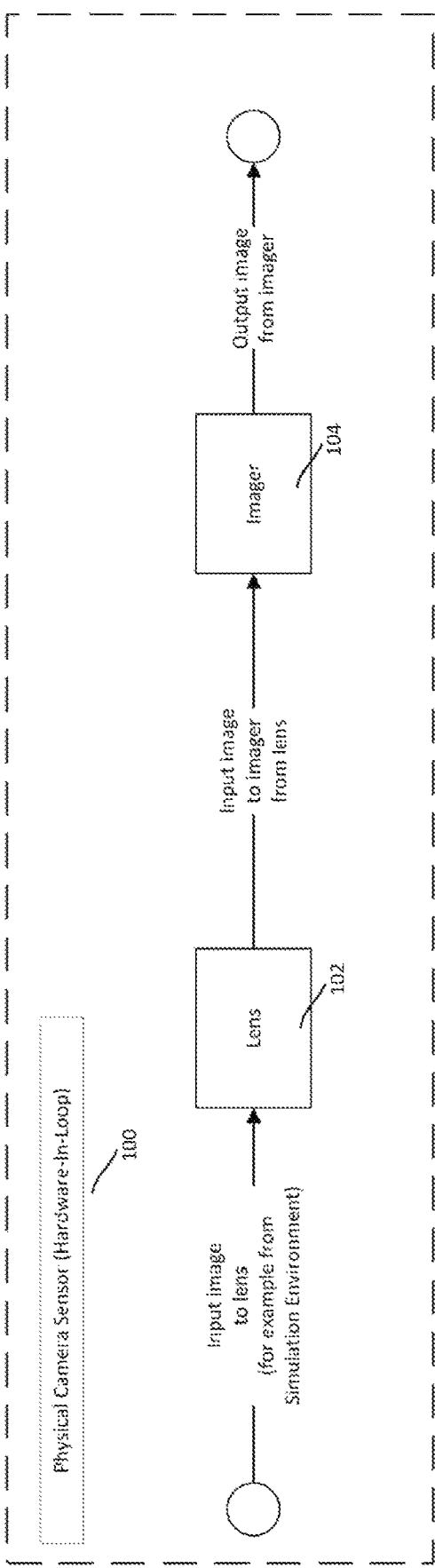
FIG. 1 is an overview of a physical camera sensor (in Hardware-In-Loop system) for a vehicle.

100—Physical Camera Sensor.
102—Physical Lens.
104—Physical Imager. Can include Image Signal Processing Unit (ISP).
106—Camera Sensor Model. This is the software simulation model of the physical camera sensor.
108—Lens Model. Represented mathematically or using simulation tools.
110—Imager Model. The model generated as a result of the system of the present invention. This is expected to produce image outputs visually similar to the physical imager.
200—Training phase of the machine learning.
202—Microcontroller or computation unit, which will command signals to the imager (or ISP) to tune its parameters.
204—Imager (ISP) parameters, which are tuned based on the previous or present image dynamically, such as, for example, exposure.
206—Imager Configuration, which is initially provided to the imager (ISP) and remains constant.
208—Raw Input Image is the input image to the camera sensor, such as, for example, generated via a simulated environment.
210—Physical Camera Sensor. Described above at 100.
212—Imager (ISP) parameters tuned initially.
214—Output of the Physical Camera Sensor. This is the result or output of the physical lens and the physical imager.
216—Trained Model as a result of the Deep Learning Algorithm.
218—Storage for trained model.
220—Deep Learning Algorithm. This can be Convolution Neural Networks or Generative Adversarial Network or other suitable Machine Learning algorithm.
222—Testing phase of the machine learning.
224—Raw input image, similar to 208 above.
226—Inference engine of the Deep Learning Algorithm 220.
228—Tuned Output Image. Result of the machine learning. This is expected to match the image described in 214.
300—Generative Adversarial Network or its variant.
302—Output image from physical sensor, same as 214 above.
304—Raw input image, same as 208 above.
306—Generator Block. This block generates images to make them look as similar as possible to output image of the physical sensor 214. This similarity metric can be defined mathematically.
308—Discriminator Block. This block compares the images generated by the generator block 306 to the output image of the physical sensor 214.
310—Feedback from discriminator to generator.
312—If discrimination is yes, the Discriminator Block was able to discriminate successfully. Feedback 310 from the discriminator goes back to Generator Block to improve the generation to make it more similar to 214. If discrimination is no, the discriminator was unable to discriminate image 304 from 302 and the output 314 then can be used instead of 302.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a display, such as a rearview display or a top down or bird's eye or surround view display or the like.

At present, vehicular camera sensors are modeled using simulation or mathematical software by using a parameterized model. In the simplest form, a camera can be parameterized using its intrinsic calibration parameters (focal length, pixel size, skew) and extrinsic parameters (mounting position, mounting roll, pitch, yaw). In the simplest form, a lens is modeled using distortion coefficients and field of view. The above parameters can be obtained from the imager and lens data sheets and/or by a camera sensor calibration process. All of this gives a fair representation of the three dimensional (3D) world into a two dimensional (2D) image as perceived by the camera sensor.

However, in addition to the above characteristics of the camera sensor, the imager itself has to be characterized as well. This has several issues. For example, an accurate representation of the imager in the form of a software simulation is not always available and defects in an imager (for example black pixels, noise) are difficult to model. Further, an imager is tuned to process the image, such as, for example, contrast adjustment, white balance, gamma correction. This is done using a large number of tunable parameters or a microcontroller to tune the imager dynamically depending on the previous image. This makes characterizing an imager expensive, difficult and/or not accurate enough to replace a physical imager. The system or simulation of the present invention accurately characterizes the imager in a software environment, and optionally the same methodology can be used to characterize both the imager and lens together or separately.

The system/method of the present invention characterizes the imager in the camera sensor model by using machine learning algorithms or techniques (for example, deep neural networks). The system considers the imager operation as a black box and only observes the image input (for example, from a simulation environment) to the imager and observes the output image (or image data) from the imager. The system will be subjected with a large dataset comprising such input-output image pairs. The system, over the period of the training, will learn the mapping between the input image and output image. The mapping may comprise imager tunings that are static across all imagers. The mapping may also comprise imager tunings that are dynamic and change depending on the input image.

In the testing phase, this mapping can be applied to the test input image, so that the output image looks similar as if it were an output of the physical imager. In this case, the mapping is a parameterized model. For example, it could be histogram equalization values or the gamma value in case of gamma correction.

Figure 2:
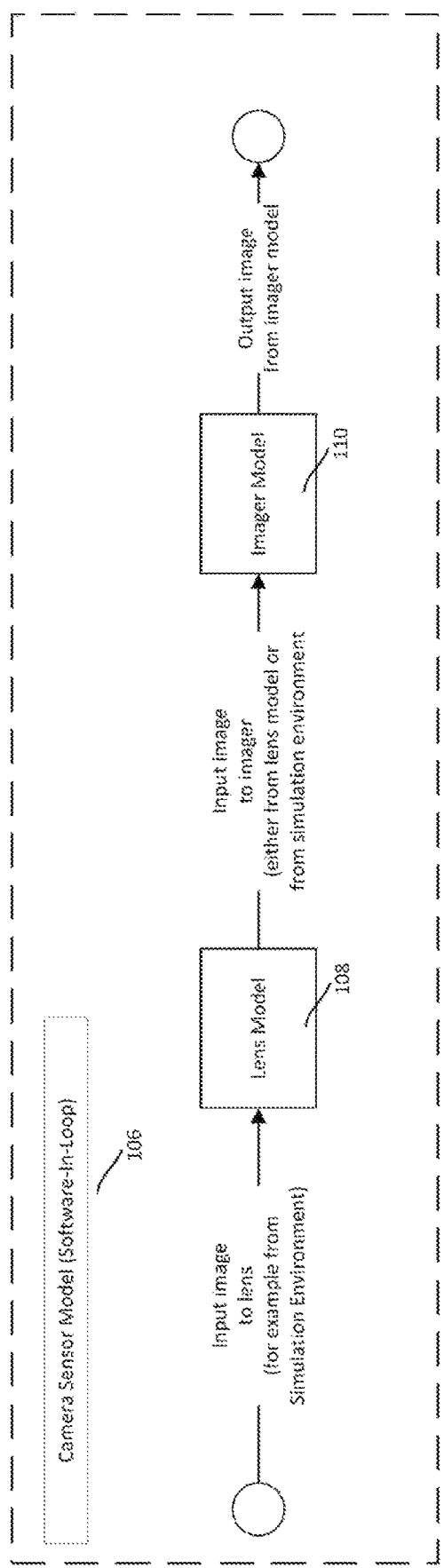
FIG. 2 is an overview of a camera sensor model (in Software-In-Loops system) for simulating the camera sensor.

As shown in FIG. 1, a physical camera sensor (hardware-in-loop) system 100 comprises a lens 102 that focuses or inputs images at an imager 104. Input images are input to the lens (such as from a simulation environment), and the lens inputs images to the imager 104, which generates output image data. As shown in FIG. 2, a camera sensor module (software-in-loop) simulation system 106 includes a lens model 108 and an imager model 110. Images from a simulation environment are input to the lens model 108, and images from the lens model (or from the simulation environment) are input to the imager model 110, which generates output image data.

Figure 3:
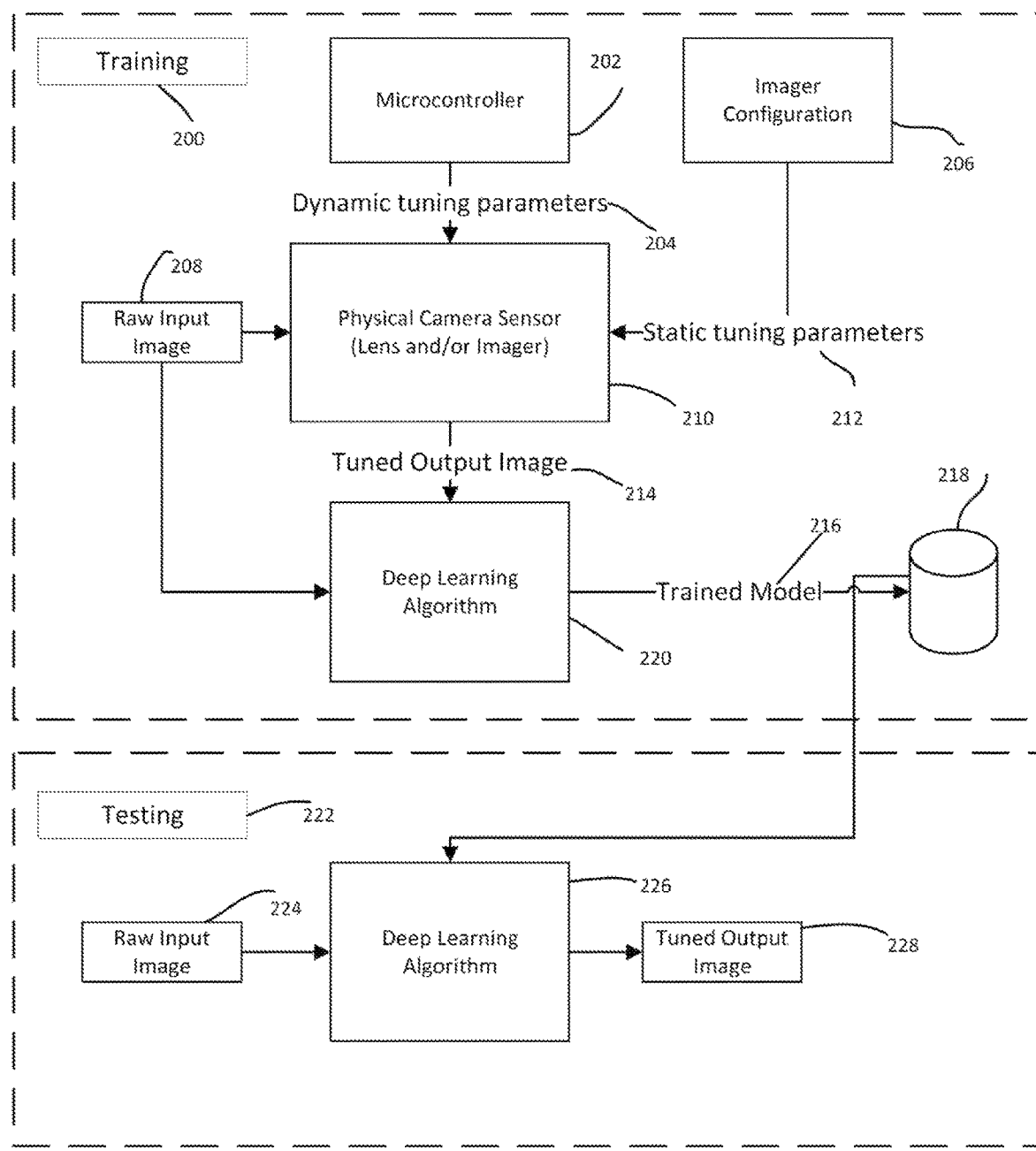
FIG. 3 is a schematic showing training and testing of a deep neural network system for simulating the camera sensor.

The simulation system of the present invention utilizes training 200 (FIG. 3) to teach the model 108 and/or model 110 to output image data similar to the output of the actual physical camera sensor (lens and/or imager). As shown in FIG. 3, the training system or process 200 includes a control (e.g., microcontroller 202) that provides or inputs dynamic tuning parameters 204 to the physical camera sensor 210 (comprising the lens and/or imager). An imager configuration 206 provides static tuning parameters 222 to the camera sensor 210. A target is placed in the field of view of the physical camera. Raw input images 208 representative of the target are input to the camera sensor and to a deep learning algorithm 220. That is, actual target data, which represents the same target in the field of view of the camera is provided to the learning algorithm 220. The tuned output image 214 (now an image data representation of the target as captured by the camera) is output from the camera sensor 210 to the deep learning algorithm 220, which generates a trained model 216 to a storage device 218 for the trained model. The deep learning algorithm 226 may generate the trained model 216 by generating a learning algorithm output and comparing that output to the tuned output image 214 of the camera and thereby determine the current effectiveness of the learning algorithm 226.

The simulation system of the present invention also includes a testing phase or process 222, which receives (from the storage device 218) the stored trained model 216 at a deep learning algorithm 226. A raw input image 224 is input to the deep learning algorithm 226, which generates a tuned output image 228 responsive to the raw input image 224 and the trained model 216. The system thus uses the trained model to simulate the camera sensor.

In some implementations, the simulation system includes a deep neural network called Generative Adversarial Network (GAN) or a variant of it. The GAN comprises two sub networks, a generative network and a discriminative network, that are pitted against each other. The system (i.e., the neural network) is initially trained using input and output images. The input and output images do not need to be in pairs for this, nor do they need pixel to pixel correspondence between them. The generator model (corresponding to the generator network) attempts to generate images that look visually similar to the output of the physical imager. The discriminator mode (corresponding to the discriminator) attempts to discriminate between the input images and the generated images. This is an iterative process with the discriminator discriminating and providing feedback to the generator and the generator producing images that look visually similar to that of the physical sensor until at one point the discriminator is unable to distinguish. This may be the stopping condition for the algorithm.

Figure 4:
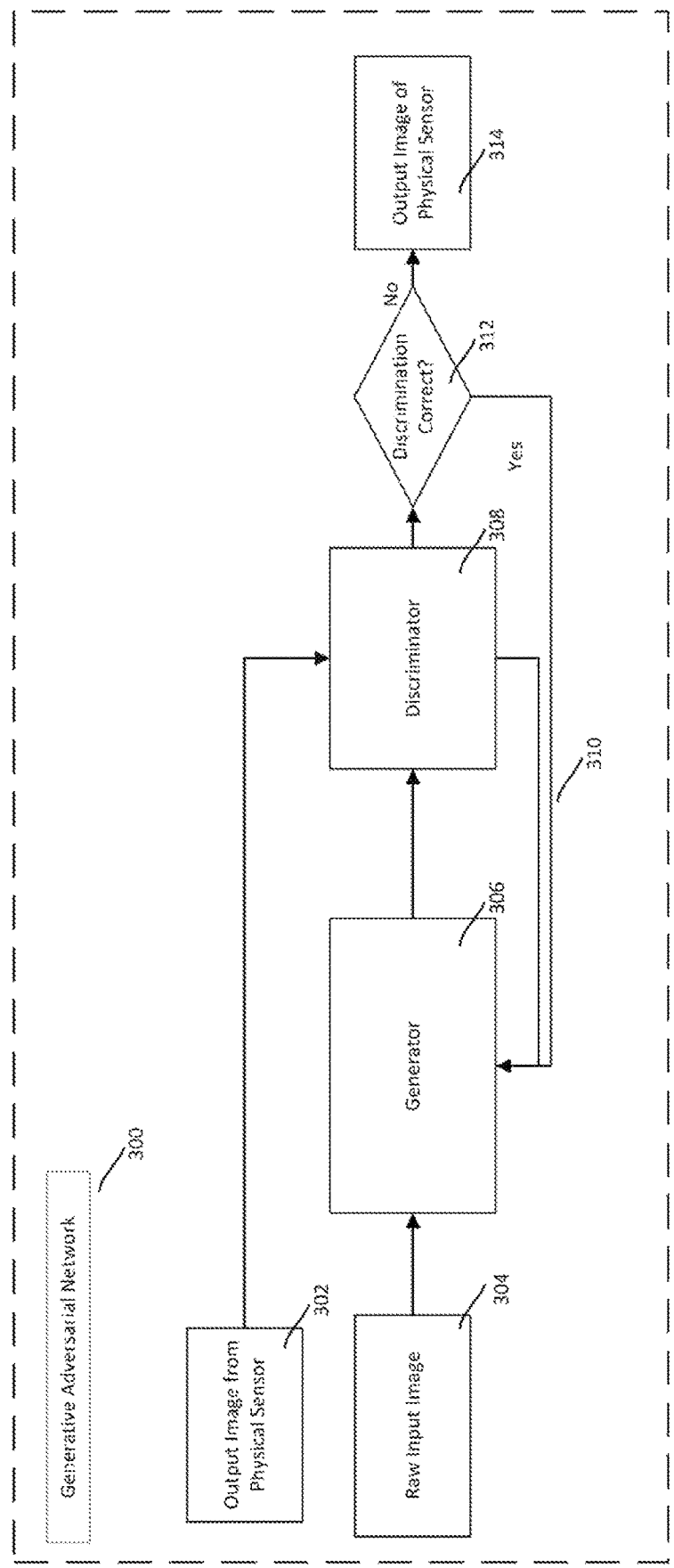
FIG. 4 is a schematic of a particular type of deep neural network system, namely a Generative Adversarial Network (GAN) system, suitable for use in the simulation of the present invention.

An example of use of a GAN 300 in the simulation system is shown in FIG. 4, where a generator 306 receives a raw input image 304 and outputs simulated image data to a discriminator 308. The discriminator also receives an output image from a physical sensor 302 and compares the simulated image data to the physical sensor image data. If the discrimination check at 312 is yes (i.e., the discriminator block 308 was able to discriminate successfully), then feedback 310 goes back to the generator block 306 to improve the generation to make it more similar to output image 214. If the discrimination check at 312 is no (the discriminator was unable to discriminate image 304 from 302), then the output 314 then can be used instead of 302.

Thus, the simulation system of the present invention uses a physical camera output and generates a simulation output and compares the physical camera output to the simulation output to train the learning algorithm, which adjusts its output until the output of the learning algorithm sufficiently matches the physical camera output (e.g. where the differences between the outputs are below a threshold level).

The camera and/or circuitry may comprise any type of camera for a vehicle driver assistance system or vision system or the like, and may utilize aspects of the cameras and vision systems described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for simulating performance of a vehicular camera, said method comprising:

providing a control comprising a data processor that is operable to execute a learning algorithm, wherein the learning algorithm comprises a generative adversarial network;

providing a vehicular camera comprising a lens and imager;

providing an actual target in a field of view of the vehicular camera;

capturing, via the vehicular camera, image data representative of the actual target as imaged by the vehicular camera;

providing the captured image data to the control;

wherein the learning algorithm comprises (i) a generator that generates an output responsive to capturing image data and (ii) a discriminator that compares the generator output to the captured image data;

providing actual target data to the control, wherein the actual target data represents the actual target provided in the field of view of the vehicular camera;

generating, via the learning algorithm, a learning algorithm output;

processing, at the control, the captured image data and the learning algorithm output, wherein processing the captured image data and the learning algorithm output comprises comparing the captured image data to the learning algorithm output;

responsive to the processing of the captured image data and the learning algorithm output, training the learning algorithm to simulate performance of the lens and the imager using the captured image data and the actual target data; and simulating, based on the training of the learning algorithm, the performance of the lens and the imager.

2. The method of claim 1, wherein the learning algorithm comprises a deep neural network.

3. The method of claim 1, comprising determining if discrimination is correct, and if discrimination is not correct, providing a feedback signal to the generator to adjust the generator output, and if discrimination is correct, outputting image data of the vehicular camera.

4. The method of claim 3, wherein the generator and the discriminator are part of a generative adversarial network.

5. The method of claim 1, wherein the vehicular camera comprises at least one of dynamic tuning parameters or static tuning parameters.

6. The method of claim 5, wherein the control controls tuning of the dynamic tuning parameters.

7. The method of claim 5, wherein simulating the performance of the lens and the imager comprises simulating the at least one of dynamic tuning parameters or static tuning parameters.

8. The method of claim 1, wherein the learning algorithm comprises a parameterized model.

9. The method of claim 1, wherein simulating the performance of the lens and the imager comprises simulating a performance of the lens that is selected from the group consisting of (i) distortion of images by the lens and (ii) a field of view provided by the lens.

10. The method of claim 1, wherein simulating the performance of the lens and the imager comprises simulating a performance of the imager that is selected from the group consisting of (i) noise, (ii) contrast, (iii) white balance, and (iv) gamma correction.

11. A method for simulating performance of a vehicular camera, said method comprising:

providing a control comprising a data processor that is operable to execute a generative adversarial network;

providing a vehicular camera comprising a lens and imager;

providing an actual target in a field of view of the vehicular camera;

capturing, via the vehicular camera, image data representative of the actual target as imaged by the vehicular camera;

providing the captured image data to the control;

providing actual target data to the control, wherein the actual target data represents the actual target provided in the field of view of the vehicular camera;

generating, via the generative adversarial network, a generative adversarial network output;

processing, at the control, the captured image data and the generative adversarial network output, wherein processing the captured image data and the generative adversarial network output comprises comparing the captured image data to the generative adversarial network output;

responsive to the processing of the captured image data and the generative adversarial network output, training the generative adversarial network to simulate performance of the imager using the captured image data and the actual target data;

simulating, based on the training of the generative adversarial network, the performance of the imager; and wherein simulating the performance of the imager comprises simulating a performance that is selected from the group consisting of (i) noise, (ii) contrast, (iii) white balance, and (iv) gamma correction.

12. The method of claim 11, wherein the generative adversarial network comprises (i) a generator that generates an output responsive to capturing image data and (ii) a discriminator that compares the generator output to the captured image data.

13. The method of claim 12, comprising determining if discrimination is correct, and if discrimination is not correct, providing a feedback signal to the generator to adjust the generator output, and if discrimination is correct, outputting image data of the vehicular camera.

14. The method of claim 11, wherein the vehicular camera comprises at least one of dynamic tuning parameters or static tuning parameters.

15. The method of claim 14, wherein the control controls tuning of the dynamic tuning parameters.

16. The method of claim 15, wherein simulating the performance of the imager comprises simulating the at least one of dynamic tuning parameters or static tuning parameters.

17. The method of claim 11, comprising simulating a performance of the lens that is selected from the group consisting of (i) distortion of images by the lens and (ii) a field of view provided by the lens.

18. A method for simulating performance of a vehicular camera, said method comprising:

providing a control comprising a data processor that is operable to execute a learning algorithm, wherein the learning algorithm comprises a generative adversarial network;

providing a vehicular camera comprising a lens and imager;

providing an actual target in a field of view of the vehicular camera;

capturing, via the vehicular camera, image data representative of the actual target as imaged by the vehicular camera;

providing the captured image data to the control;

wherein the learning algorithm comprises (i) a generator that generates an output responsive to capturing image data and (ii) a discriminator that compares the generator output to the captured image data;

providing actual target data to the control, wherein the actual target data represents the actual target provided in the field of view of the vehicular camera;

generating, via the learning algorithm, a learning algorithm output;

processing, at the control, the captured image data and the learning algorithm output, wherein processing the captured image data and the learning algorithm output comprises comparing the captured image data to the learning algorithm output;

responsive to the processing of the captured image data and the learning algorithm output, training the learning algorithm to simulate performance of the lens and the imager using the captured image data and the actual target data;

simulating, based on the training of the learning algorithm, the performance of the lens and the imager;

wherein simulating the performance of the lens and the imager comprises simulating a performance of the lens that is selected from the group consisting of (i) distortion of images by the lens and (ii) a field of view provided by the lens; and wherein simulating the performance of the lens and the imager comprises simulating a performance of the imager that is selected from the group consisting of (i) noise, (ii) contrast, (iii) white balance, and (iv) gamma correction.

\* \* \* \* \*